United States Patent [19]

Dimitroff

[11] 4,321,056
[45] Mar. 23, 1982

[54] MEASUREMENT OF ENGINE OIL CONSUMPTION

[75] Inventor: Edward Dimitroff, San Antonio, Tex.

[73] Assignee: Cummins Engine Company, Inc., Columbus, Ind.

[21] Appl. No.: 220,998

[22] Filed: Dec. 29, 1980

[51] Int. Cl.³ ............................................. G01N 33/28
[52] U.S. Cl. ..................... 23/230 HC; 23/230 M; 73/116
[58] Field of Search ......... 23/230 HC, 230 M, 232 R; 73/61.1 R, 116, 35

[56] References Cited

U.S. PATENT DOCUMENTS

| | | | |
|---|---|---|---|
| 2,868,011 | 1/1959 | Coggeshall | 73/23.1 |
| 2,999,383 | 9/1961 | Bryan | 73/116 |
| 3,096,157 | 7/1963 | Brown et al. | 23/232 R |
| 3,822,581 | 7/1974 | Hauck et al. | 73/116 |
| 4,040,783 | 8/1977 | Collin | 23/232 R |
| 4,053,433 | 10/1977 | Lee | 252/408 R |
| 4,056,006 | 11/1977 | Smith et al. | 73/339 R |
| 4,061,467 | 12/1977 | Becker et al. | 23/232 R |
| 4,153,418 | 5/1979 | Haas | 23/232 R |

FOREIGN PATENT DOCUMENTS

| | | | |
|---|---|---|---|
| 54-10789 | 1/1979 | Japan | 23/230 HC |
| 54-10790 | 1/1979 | Japan | 23/230 HC |

*Primary Examiner*—Kenneth M. Schor
*Attorney, Agent, or Firm*—Neuman, Williams, Anderson & Olson

[57] ABSTRACT

The oil consumption of an internal combustion engine is determined by analyzing for the amount of water soluble zinc compounds found in the engine exhaust gas, after zinc dialkyldithiophosphate has been added to the oil.

2 Claims, 1 Drawing Figure

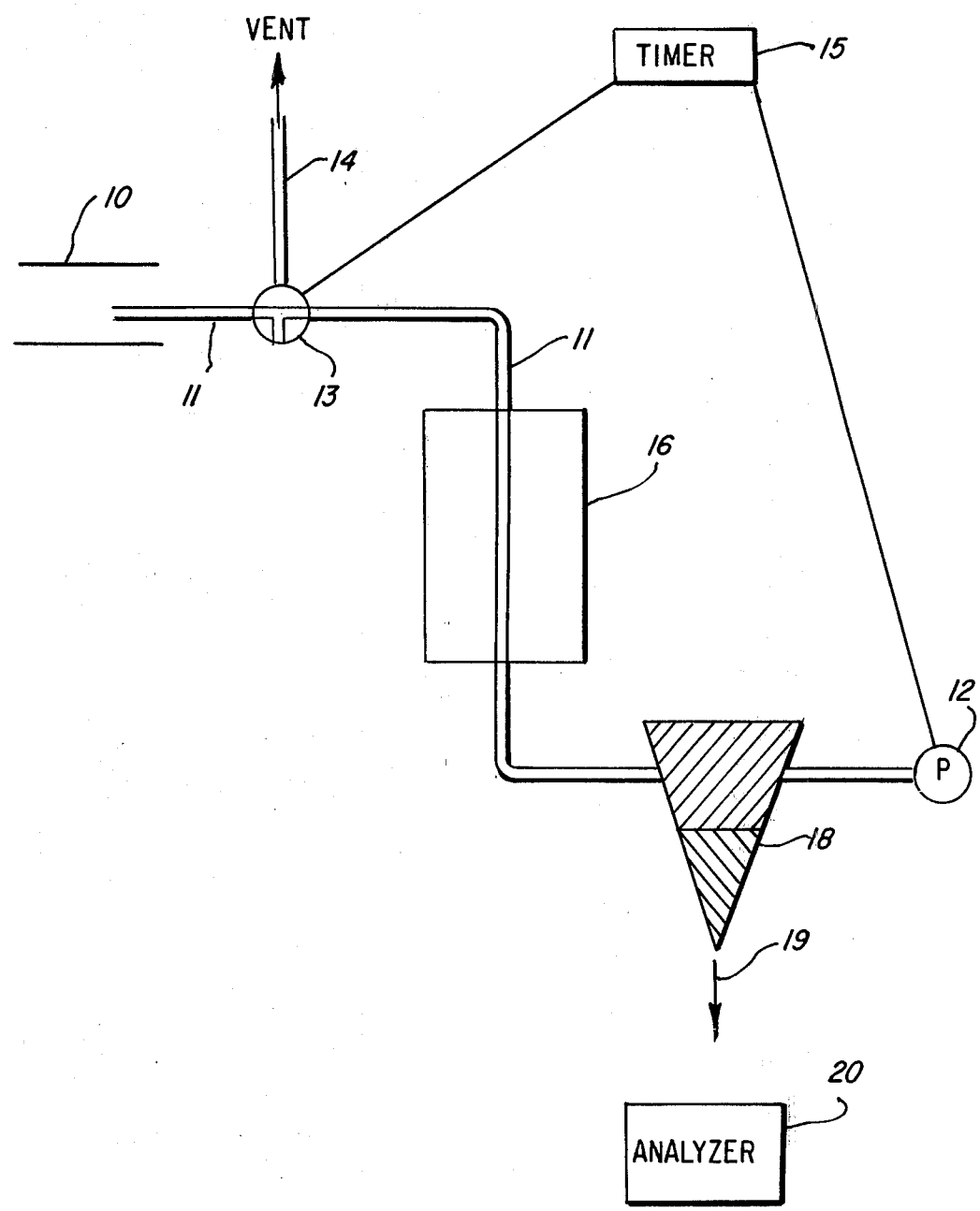

MEASUREMENT OF ENGINE OIL CONSUMPTION

This invention relates to the measurement of oil consumption of an internal combustion engine.

In order to evaluate engineering modifications or new concepts in internal combustion engines, an extremely important aspect that must be considered is oil consumption. New engine designs or modifications to existing engines necessitate that there be some means for rapidly and accurately measuring oil consumption to insure that the changes in the engine have not drastically altered the oil consumption rate.

Current methods in use for measuring oil consumption such as the volumetric or drain weight method lack the required accuracy or sensitivity or utilize costly, elaborate and sometimes hazardous radioisotope tracer techniques.

It is therefore a principal object of this invention to provide a rapid and accurate method of determining oil consumption of internal combustion engines, which method does not involve the use of radioactive materials.

It is another object of the invention to provide an arrangement of apparatus for rapidly and accurately determining oil consumption of internal combustion engines.

The method of the present invention involves the use of the oil lubricating additive, zinc dialkyldithiophosphate and analysis of the exhaust gas from an internal combustion engine to determine the amount of zinc (in the form of zinc sulfate) therein. The amount of zinc (in the form of zinc sulfate) in the engine exhaust gas is directly proportional to the oil consumption of the engine.

The invention will be fully understood from the following description when read in conjunction with the single FIGURE of the drawing which is a schematic view of the associated elements of apparatus for determining oil consumption.

Referring to the drawing, an exhaust pipe of an internal combustion engine is schematically indicated at 10, the remainder of the engine not being shown, and being, for example, a gasoline or diesel internal combustion engine. The concentration of the lubricant additive, zinc dialkyldithiophosphate, used in the engine lubricating oil is known or determined. The engine is operated and under conditions in the engine combustion chamber the lubricant additive zinc dialkyldithiophosphate decomposes forming the decomposition compound zinc sulfate, which is water soluble. A conduit 11, preferably of stainless steel, is coupled with the exhaust pipe 10. A vacuum pump 12 is provided for drawing the exhaust gas to be sampled through conduit 11. The exhaust gas is directed to a three-way valve 13. This valve directs the exhaust gas through the continuation of conduit 11 for analysis or permits by-passing and venting of the exhaust gas through vent line 14. The three-way valve 13 is conveniently a three-way solenoid valve, the operation of which is controlled by a timer 15.

When the exhaust gas is to be analyzed, three-way valve 13 is positioned so that the exhaust gas continues to flow through line 11 which passes through a condensing zone 16 which can, for example, be an ice-water bath maintained at a relatively low temperature of say 36° to 38° F. In passing through the condensing zone 16, condensibles including water and zinc sulfate in the exhaust gas condenses. The condensed water-containing zinc sulfate in solution then passes to a liquid-liquid separator 18 which, for example, can be a separatory funnel containing a liquid. An organic alkane liquid, such as n-octane, n-nonane, n-decane and n-undecane, is provided in separator 18 to effect separation between the organic containing exhaust gas components soluble therein and water containing soluble zinc sulfate which is a combustion decomposition product of the zinc dialkyldithiophosphate. Phase separation occurs in the separator 18 with the water phase being removed therefrom via line 19 for analysis in analyzer 20. In a simple and preferred embodiment, analyzer 20 comprises a colorimeter in association with an electronic computer which translates the amount of water soluble zinc in the test sample to specific oil consumption. Colorimetry as a method of chemical analysis is well known as are the use of colorimeters associated with electronic computers to give a direct analysis read out and thus will not be discussed herein. Methods other than colorimetry can also be used for analyzing the amount of the water soluble zinc compound found in a sample of the exhaust gas.

An illustrative example of the practice of this invention is as follows: The inlet conduit 11 is coupled to the exhaust pipe 10 of a diesel engine. The vacuum pump 12 is activated by timer 15 and at the same time, timer 15 activates the three-way solenoid valve 13 so that exhaust gas flow is directed through the condensing zone 16. Vacuum pump 12 is set to draw the exhaust gas through the system at a flow rate of 45 cubic feet per hour. The timer is set for a 5 minute sampling period at which time it activates solenoid valve 13 to direct the exhaust gas flow through vent line 14 and at the same time shuts off vacuum pump 12. The condensibles in the sample, which in this instance is a 5 minute gas sample, which condense in condensing zone 16 then pass into liquid-liquid separator 18 which contains the organic liquid n-decane. Phase separation between the organic and water occurs in separator 18 and the bottom aqueous layer is removed via line 19. Two milliliters of the aqueous bottom layer from separator 18 are introduced into a disposable plastic colorimetric cell. One milliliter of distilled or deionized water is added to the sample in the colorimetric cell followed by 300 microliters of a pH 9 sodium hydroxide buffer solution and 150 milliliters of zincon solution. After mixing the cell is placed into the colorimeter analyzer (Markson Colorimeter) and the computer (Microsense Corporation) is activated, and after 5 minutes a reading is taken. The amount of zinc found in the sample is directly proportional to oil consumption and by calibration with known oil consumption rates a measurement of oil consumption in pounds per hour or pounds per hour per horsepower is rapidly accomplished.

The accuracy of the method of the invention is ±0.00005 pounds per hour per horsepower. The oil consumption measurements can be made rapidly, i.e., in about 10 minutes.

Those modifications and equivalents which fall within the spirit of the invention are to be considered a part thereof.

What is claimed is:

1. A process of measuring the consumption of oil by an internal combustion engine which comprises operating said engine with a lubricating oil containing a known concentration of zinc dialkyldithiophosphate, withdrawing a sample of the exhaust gas from the engine, passing the exhaust gas sample through a condensation zone to condense water and water soluble zinc sulfate in said gas sample, then passing the exhaust gas sample with condensed water and water soluble zinc sulfate to liquid-liquid separating means containing an organic liquid, permitting a phase separation between the organic liquid and water to occur in said separating means, withdrawing an aqueous phase from said separating means and subjecting at least a portion of the aqueous phase to analysis to determine the zinc content thereof.

2. A process in accordance with claim 1 wherein the analyzis utilized is colorimetric analysis.

* * * * *